US012617626B2

(12) United States Patent
Ryu et al.

(10) Patent No.: US 12,617,626 B2
(45) Date of Patent: May 5, 2026

(54) ROLLER STRUCTURE INCLUDING BEARING STRUCTURE AT ONE SIDE FOR TRANSPORTING PRODUCT

(71) Applicant: S.E.A Co., Ltd., Gyeongsangbuk-do (KR)

(72) Inventors: Kihong Ryu, Gyeongsangbuk-do (KR); Jaeho Shin, Gyeongsangbuk-do (KR)

(73) Assignee: S.E.A CO., LTD, Gyeongsangbuk-do (KR)

( * ) Notice: Subject to any disclaimer, the term of this patent is extended or adjusted under 35 U.S.C. 154(b) by 80 days.

(21) Appl. No.: 18/734,507

(22) Filed: Jun. 5, 2024

(65) Prior Publication Data

US 2025/0223111 A1 Jul. 10, 2025

(30) Foreign Application Priority Data

Jan. 9, 2024 (KR) ........................ 10-2024-0003811

(51) Int. Cl.
*B65G 39/02* (2006.01)
(52) U.S. Cl.
CPC ................................... *B65G 39/02* (2013.01)
(58) Field of Classification Search
CPC ........ B65G 39/02; B65G 49/02; B65G 39/12; B65G 13/02; B65G 39/09; B65G 49/061; B65G 2201/022; H01L 21/02; H01L 21/6776; F16C 13/02; H10F 71/00; Y10T 29/53104; Y10T 74/2116; Y10S 148/906
USPC ........... 198/781, 369.4, 69.6, 370.04; 193/37
See application file for complete search history.

(56) References Cited

U.S. PATENT DOCUMENTS 3,672,486 A * 6/1972 Kennedy et al. ...... B65G 13/07
198/791
2017/0243768 A1 * 8/2017 Li ........................... C03C 15/00
2020/0072283 A1 * 3/2020 Roberts et al. ....... F16C 33/303

FOREIGN PATENT DOCUMENTS

KR 20080060408 A * 7/2008 ........... B65G 49/063
KR 100923476 B1 10/2009

OTHER PUBLICATIONS

Modular Components & Automation, https://www.modularcomponents.com.au/conveyors/roller-conveyors/manual-roller-conveyors/, Manual Roller Conveyors, May 22, 2019, "item" (Year: 2019).*

* cited by examiner

*Primary Examiner* — Gene O Crawford
*Assistant Examiner* — Amari J Meddling
(74) *Attorney, Agent, or Firm* — Barnes & Thornburg, LLP; Tina M. Dorr

(57) ABSTRACT

The present invention relates to a roller structure used in mechanical conveying systems. A roller structure includes a roller bar that rotates for transporting a product arranged thereon for transporting the product in one direction, a block fixing part coupled to the roller bar to fix the roller bar on one end part (a first end part) of the roller bar, and a bearing structure part that maintains straightness of the rotation of the roller bar during operation of the roller bar while maintaining the roller bar on another end part (a second end part) opposite to the roller bar.

8 Claims, 10 Drawing Sheets

230

20

222

325

ROLLER STRUCTURE INCLUDING BEARING STRUCTURE AT ONE SIDE FOR TRANSPORTING PRODUCT

CROSS-REFERENCE TO RELATED APPLICATIONS

A claim for priority under 35 U.S.C. § 119 is made to Korean Patent Application No. 10-2024-0003811 filed Jan. 9, 2024, in the Korean Intellectual Property Office, the entire contents of which are hereby incorporated by reference.

TECHNICAL FIELD

Embodiments of the present disclosure described herein relate to a roller structure for transporting a product used in a substrate processing apparatus for processing a product such as a substrate and, more particularly, to a roller structure including a bearing structure at one side of the roller structure.

BACKGROUND

A substrate processing apparatus, such as a wet station, for processing various substrates for producing wafers for semiconductor or cells for solar cells includes a roller structure for transporting a substrate which is a product to be processed.

Such a processing apparatus is configured to process a product by using various types of chemicals, depending on the process of product processing. For example, a wet station is able to perform substrate cleaning and etching processes. In addition, the product processing apparatus is configured to process a product in a relatively high temperature environment depending on the type or characteristics of the process.

Meanwhile, the roller structure included in the processing apparatus may be damaged or deformed depending on repeated performance of the process or a harsh environment inside the processing apparatus. Damage and deformation of the roller structure may cause unnecessary vibration of the substrate being transported on roller bars of the roller structure or cause the substrate to deviate from a designated path. This may lead to a decrease in the yield of a final product.

Therefore, it is important to configure the roller structure so that the roller structure operates properly even during repeated processes or in harsh environments inside the processing apparatus.

Korean Patent No. 10-0923476 (registered on Oct. 19, 2009) discloses a device of a Schmid-type inline roller structure as a device for transporting a circuit board as a flexible planar material.

The information described above is for illustrative purposes only, may include contents that do not constitute part of the prior art, and may not include what the prior art may suggest to those skilled in the art.

SUMMARY

In one embodiment, the present disclosure may provide a roller structure used to transport a product such as a substrate in a substrate processing apparatus, etc., wherein the roller structure includes a roller bar that rotates to transport a product disposed on the roller bar in one direction, a block fixing part coupled to the roller bar to fix the roller bar at one end part (a first end part) of the roller bar, and a bearing structure part configured to maintain the straightness of the rotation of the roller bar during operation of the roller bar while maintaining the roller bar at another end part (a second end part) on the opposite side of the roller bar.

According to an aspect of the present disclosure, there is provided a roller structure used to transport a product, the roller structure including a roller bar that allows the product to be arranged thereon and rotates for transporting the product in one direction, a block fixing part coupled to the roller bar to fix the roller bar on a first end part which is one end part of the roller bar, and a bearing structure part that maintains straightness of the rotation of the roller bar during operation of the roller bar while maintaining the roller bar on a second end part which is another end part opposite to the one end part of the roller bar.

The roller structure may be arranged inside an apparatus in which processing processes of the product are performed, and the bearing structure part may allow a movement of the roller bar in at least a first direction while the processing processes are performed.

The first direction may be an upward direction which is a direction in which the product is disposed, and the bearing structure part may be arranged on a connection structure part including an empty side in the first direction so that the bearing structure part is movable in the first direction inside the apparatus.

The connection structure part may include a hole part in which the bearing structure part is arranged, and the bearing structure part may be arranged to be movable in the first direction inside the hole part.

The roller bar may include a rotation shaft to rotate for transporting the product, and the bearing structure part may include a first ring part arranged to surround the rotation shaft, and a second ring part arranged to surround the first ring part.

The first ring part and the second ring part may be respectively formed of materials different from each other.

The first ring part may be formed of polyetheretherketone (PEEK), and the second ring part may be formed of ultra-high molecular weight polyethylene (UPE).

The block fixing part may include a block in which a hole through which the rotation shaft passes is formed, and the rotation shaft may pass through the block and be connected to a drive gear for rotating the roller bar.

On the first end part, the drive gear may be engaged with a gear mounted on a drive bar that rotates for the rotation of the roller bar, and the roller bar may be arranged perpendicular to the drive bar and rotate according to the rotation of the drive bar.

According to another aspect of the present disclosure, there is provided a substrate processing apparatus including the roller structure, with the roller structure including a plurality of roller structures, wherein the product is a substrate, and each roller bar of the plurality of roller structures rotates in cooperation with each other to transport the substrate.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
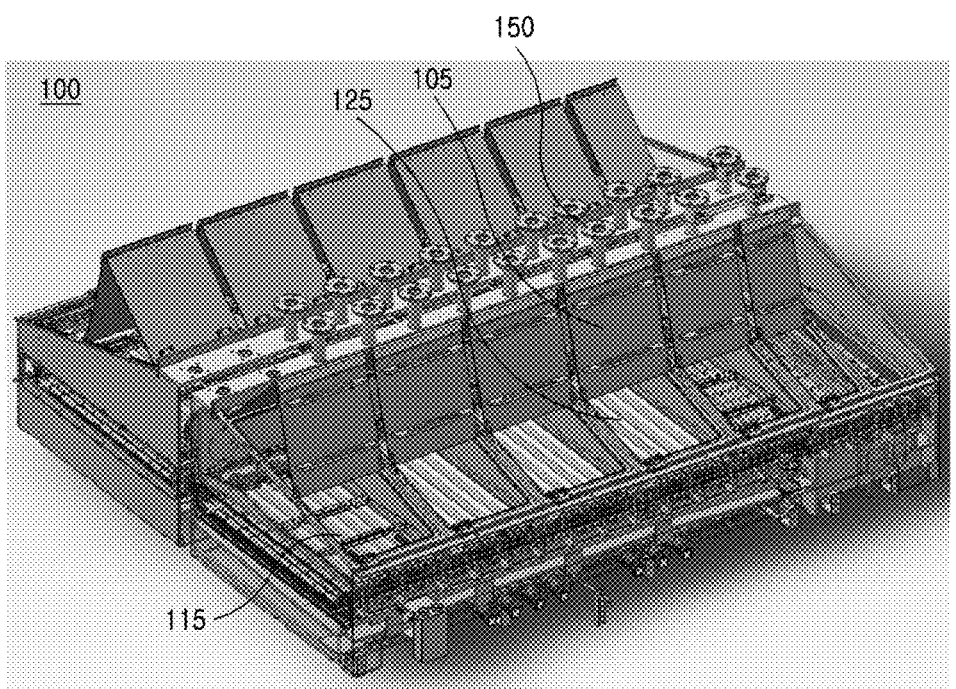
FIG. 1 illustrates a product processing apparatus including a plurality of roller structures according to an embodiment.

Hereinafter, embodiments will be described in detail with reference to the attached drawings. The same reference numerals in each drawing indicate the same members.

FIG. 1 illustrates a product processing apparatus including a plurality of roller structures according to an embodiment.

In the embodiment, a product is a target that is processed through a process or reaction within a product processing apparatus 100, and may be, for example, a substrate. Accordingly, the product processing apparatus 100 may be the substrate processing apparatus 100, and in the detailed description to be described later, the terms "the product processing apparatus 100" and "the substrate processing apparatus 100" may be used interchangeably, and the terms "product" and "substrate" may be used interchangeably.

The product processing apparatus 100 may be configured to process a substrate (or a product) by using a processing solution inside the apparatus 100.

The product processing apparatus 100, as a product, may be an apparatus for processing various substrates for producing wafers for semiconductors or cells for solar cells.

The product processing apparatus 100 may be a wet station. Such a wet station can be configured to process a substrate by using various types of chemicals, depending on a substrate processing process. The wet station may, for example, perform the cleaning and etching processes of the substrate. The wet station may be configured to process the substrate at relatively high temperatures or other harsh environments, depending on the type or characteristics of a process.

For example, the product processing apparatus 100 is an apparatus for processing a substrate or a wafer for manufacturing solar cells, and may include a wet station for producing n-TOPCON cells among single crystal silicon solar cells.

In the illustrated example, the reference numeral of the substrate is omitted.

The product processing apparatus 100 may include an outer cover 105 disposed to distinguish the internal space of the product processing apparatus 100 from the outside, at least one inner cover 115 disposed in the internal space to distinguish an upper space and a lower space of the internal space from each other, and at least one roller 125 disposed to transport the substrate inside a lower space 120. The operation of the roller 125 may be controlled by a driving part not shown. Such a driving part may include at least one motor and/or actuator. The roller 125 may include a plurality of rollers. Each of the rollers 125 may be referred to as a roller structure, and will be described in more detail with reference to FIGS. 2 to 6 below.

Meanwhile, although not shown, a bath that accommodates the processing solution for processing a substrate may be included under the roller 125. The bath may represent a reaction container in which the processing solution for processing a substrate is accommodated. Such a bath may be provided under the roller 125. The processing solution (i.e., a chemical) may be different depending on a process on the substrate performed through the product processing apparatus 100. For example, the processing solution may be an etching solution for etching the substrate, or a cleaning solution for cleaning the substrate, etc.

The substrate may be placed on the roller 125 by the product processing apparatus 100, and a surface thereof may be processed by the processing solution while the substrate is transported according to the operation of the roller 125.

Additionally, the product processing apparatus 100 may include an exhaust part 150 for circulating airflow and forming exhaust inside the apparatus.

Meanwhile, as illustrated, the outer cover 105, the inner cover 115, the roller 125, and the bath, etc. of the product processing apparatus 100 may constitute one processing cell. The product processing apparatus 100 may include a plurality of processing cells. In this case, each of the processing cells may be connected to the exhaust part 150 through a single integrated exhaust pipe, and air from each of the processing cells may be exhausted through the integrated exhaust part.

In addition, the substrate processing apparatus 100 may be implemented in a symmetrical form as shown and may include a plurality of processing cells on opposite sides thereof.

Accordingly, the substrate processing apparatus 100 is capable of processing a large amount of substrates (or products) simultaneously.

As illustrated, the roller 125 included in each processing cell of the substrate processing apparatus 100 may include the plurality of roller structures including a plurality of roller bars.

Hereinafter, the roller structure of the embodiment will be described in more detail.

Figure 2A:
FIGS. 2A and 2B illustrate a roller structure according to an embodiment.
Figure 2B:
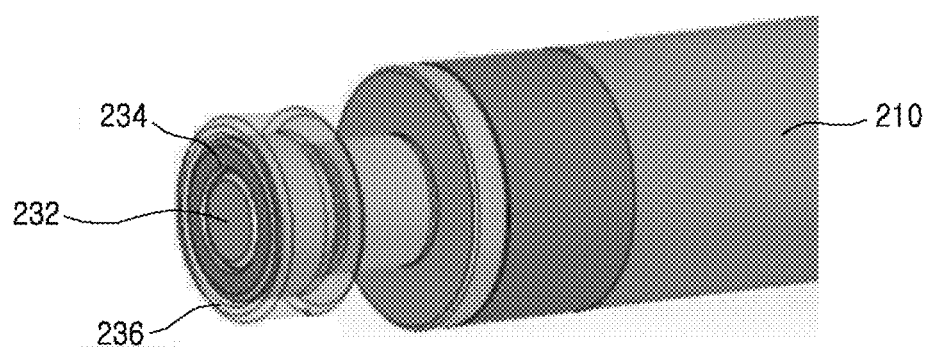

FIGS. 2A and 2B illustrate a roller structure according to an embodiment.

FIG. 2A illustrates a roller structure 200 configured to include one roller bar 210. FIG. 2B illustrates a bearing structure part 230 of a second end part of the roller structure 200.

The roller structure 200 is a device used to transport a product such as a substrate and may be included in the roller 125 of the product processing apparatus 100 described above.

The roller structure 200 may include the roller bar 210 that allows a product, such as a substrate, to be disposed thereon and rotates to transport the product in the one direction. The roller bar 210 may rotate with respect to a rotation shaft, and due to the rotation of the roller bar 210, the product placed on the roller bar 210 may be transported in the direction of the rotation.

The roller structure 200 may include a block fixing part 220 coupled to the roller bar 210 to fix the roller bar 210 at a first end part which is one end part of the roller bar 210, and may include the bearing structure part 230 configured to maintain the straightness of the rotation of the roller bar 210 during the operation (that is, rotation) of the roller bar 210 while maintaining the roller bar 210 at the second end part which is another end part at a side opposite to the one end part. The bearing structure part 230 may be configured to maintain the straightness of the rotation of the roller bar 210 in spite of the deformation or damage of the roller structure 200 due to the rotation of the roller bar 210 in a high temperature or high pressure environment or the wear of the roller structure 200 and surrounding structures due to the high speed and repeated rotation of the roller bar 210.

The one end part and the another end part may be opposite to those illustrated in FIG. 2A.

The block fixing part 220 may be configured to fix the roller bar 210 through a block. A more specific structure of the block fixing part 220 will be described in more detail with reference to FIGS. 2C to 6, which will be described later.

With reference to FIG. 2B, the bearing structure part 230 will be described in more detail.

As illustrated in FIG. 2B, the roller bar 210 may include a rotation shaft 232 for rotation to transport a product. The roller bar 210 may be rotated according to the rotation of the rotation shaft 232.

The bearing structure part 230 may include a first ring part 234 arranged to surround the rotation shaft 232 and a second ring part 236 arranged to surround the first ring part 234. The rotation shaft 232, the first ring part 234, and the second ring part 236 may be concentric. Meanwhile, unlike what is shown, the first ring part 234 and the second ring part 236 may not be implemented as rings, but may be implemented in a form in which each layer such as the first layer and the second layer is stacked.

The first ring part 234 may serve as a bearing for the rotation of the rotation shaft 232. In this way, the first ring part 234 functions as a bearing, so that the rotation of the roller bar 210 may be efficiently performed, and wear due to the rotation of the roller bar 210 may be minimized. The first ring part 234 may be forcibly fitted into the roller bar 210. The second ring part 236 may be arranged to surround the outside of the first ring part 234. The second ring part 236 may be loosely fitted over the first ring part 234. The second ring part 236 may be movably mounted in the longitudinal direction of the rotation shaft 232. When the second ring part 236 moves in a direction toward the exposed surface of the rotation shaft 232 (in FIG. 2B), a portion of the second ring part 236 may protrude more compared to the rotation shaft 232 and the first ring part 234, but when the second ring part 236 moves in a direction opposite to the direction toward the surface, the rotation shaft 232 and the first ring part 234 may protrude more than the second ring part 236. The second ring part 236 includes a holding jaw (not shown) that prevents the second ring part 236 from being removed from a roller, and thus the holding jaw may be held on the first ring part 234, so that the second ring part 236 may be prevented from being removed out of the roller. The holding jaw may be formed on one side of the second ring part 236, and may be assembled to be directed toward the inside of the roller to be held on the first ring part 234. Meanwhile, the second ring part 236 may not be in a ring shape, but may be in a shape that surrounds the entire surface (i.e., a flat surface) of the rotation shaft 232 and the first ring part 234 as seen in FIG. 2B.

The first ring part 234 and the second ring part 236 may be respectively formed of materials different from each other. For example, the first ring part may be formed of polyetheretherketone (PEEK), and the second ring part may be formed of ultra-high molecular weight polyethylene (UPE). UPE, as commonly known, has the highest impact resistance among plastics and has low coefficient of friction due to high self-lubrication, and good sliding characteristics (smoothness), and PEEK also has high tensile strength and impact resistance, heat resistance, and very low moisture absorption. By making the first ring part 234 and the second ring part 236 of the above materials, the functionality of the bearing structure part 230 as a bearing may be maximized.

Figure 2C:
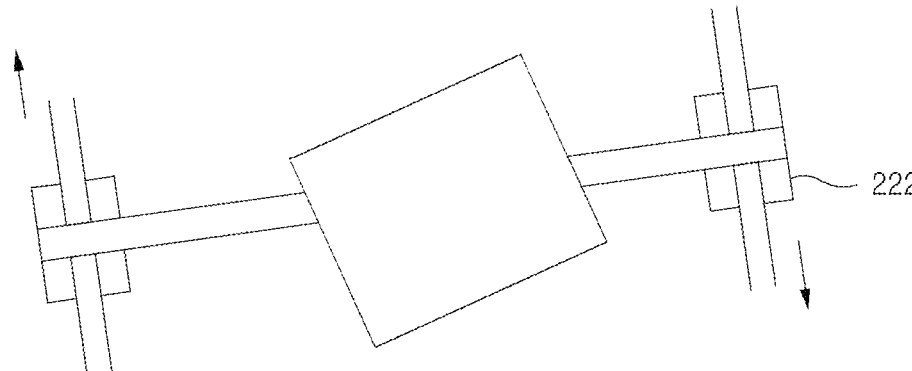
FIG. 2C illustrates a roller structure of the product processing apparatus and a product disposed on the roller structure.

Meanwhile, FIG. 2C illustrates the roller structure of the product processing apparatus and a product disposed on the roller structure.

In FIG. 2C, the roller structure 20 is illustrated without including the bearing structure part 230 described above with reference to FIG. 2B.

The roller structure 20 includes a block fixing part provided on each of opposite sides of the roller bar. The block fixing part of the roller structure 20 may correspond to the block fixing part 220 of the roller structure 200 of the embodiment.

The block fixing part may include a block 222 for fixing the roller bar. As shown, for example, the block 222 may be an H-type block. The rotation shaft of the roller bar may be arranged through the block 222, and the block 222 may allow the roller bar (the rotation shaft) to be fixed. Here, 'fixed' may mean a state in which the rotation of the roller bar (the rotation shaft) is possible, but the movement of the roller bar (the rotation shaft) is not possible.

In the roller structure 20 of FIG. 2C (the roller bar 210 does not have the bearing structure part 230 but have the block fixing part 220 formed on each of opposite sides thereof), when the straightness of the roller bar 210 is slightly distorted due to various reasons such as an equipment manufacturer's inexperience in assembly, thermal deformation, or vibration, etc., the roller bar 210 is arranged by diagonally penetrating the block 222 on each of the opposite sides, and this causes the roller bar 210 to rotate and cause severe friction with the block 222. This severe friction may interfere with the rotation of the roller bar 210, causing the condensed rotational force to be applied to the roller bar 210 and causing a substrate on the roller bar 210 to bounce. Such unstable rotations of the roller bars 210 may cause heat radiation by varying the number of rotations of the roller bars 210, which may lead to a decrease in the yield of a final product.

In an embodiment, as illustrated in FIG. 2B, the bearing structure part 230 is formed only on the another end part of the roller bar 210, and thus it is possible to solve a problem occurring in the roller structure 20 of FIG. 2C. In other words, due to the role of the bearing structure part 230 as a bearing described above, the straightness of the rotation of the roller bar 210 may be maintained under harsh environments or even when the roller structure 200 is partially deformed or damaged.

As above, the description of the technical features described above with reference to FIG. 1 may also be applied to FIGS. 2A to 2C, so redundant description thereof will be omitted.

Figure 3A:
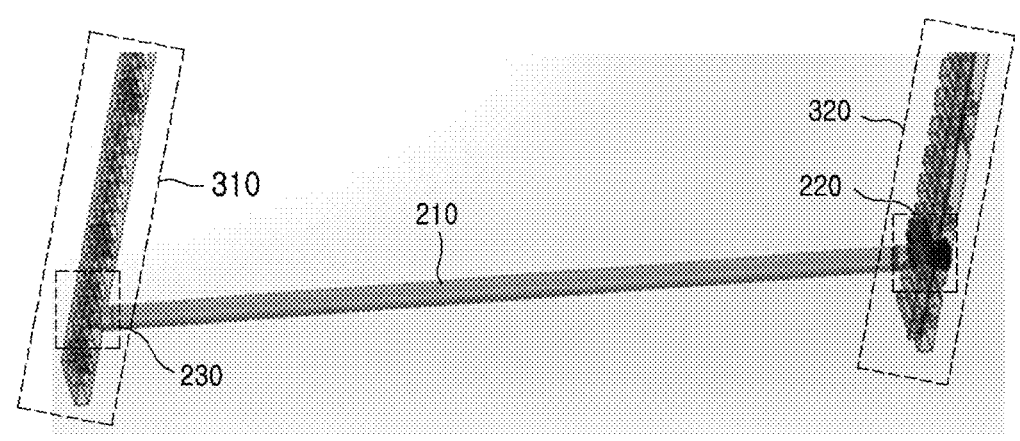
FIGS. 3A to 3C illustrate a roller structure and an arrangement structure of the product processing apparatus in which the roller structure is arranged according to one example.
Figure 3B:
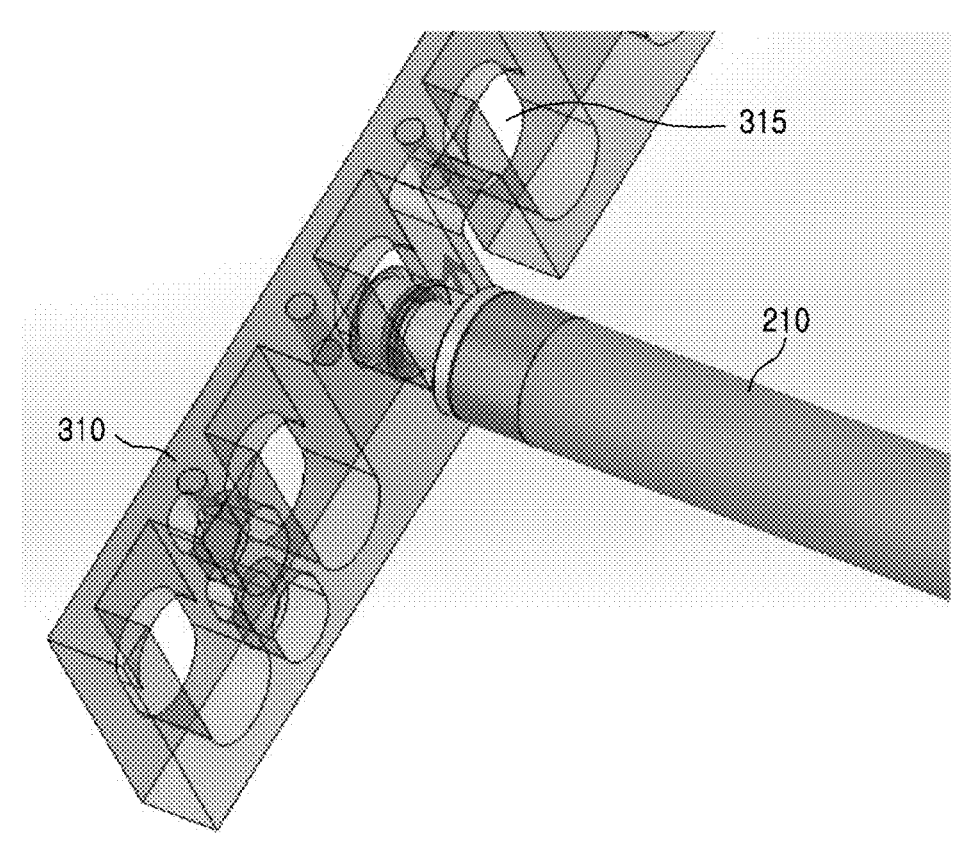
Figure 3C:
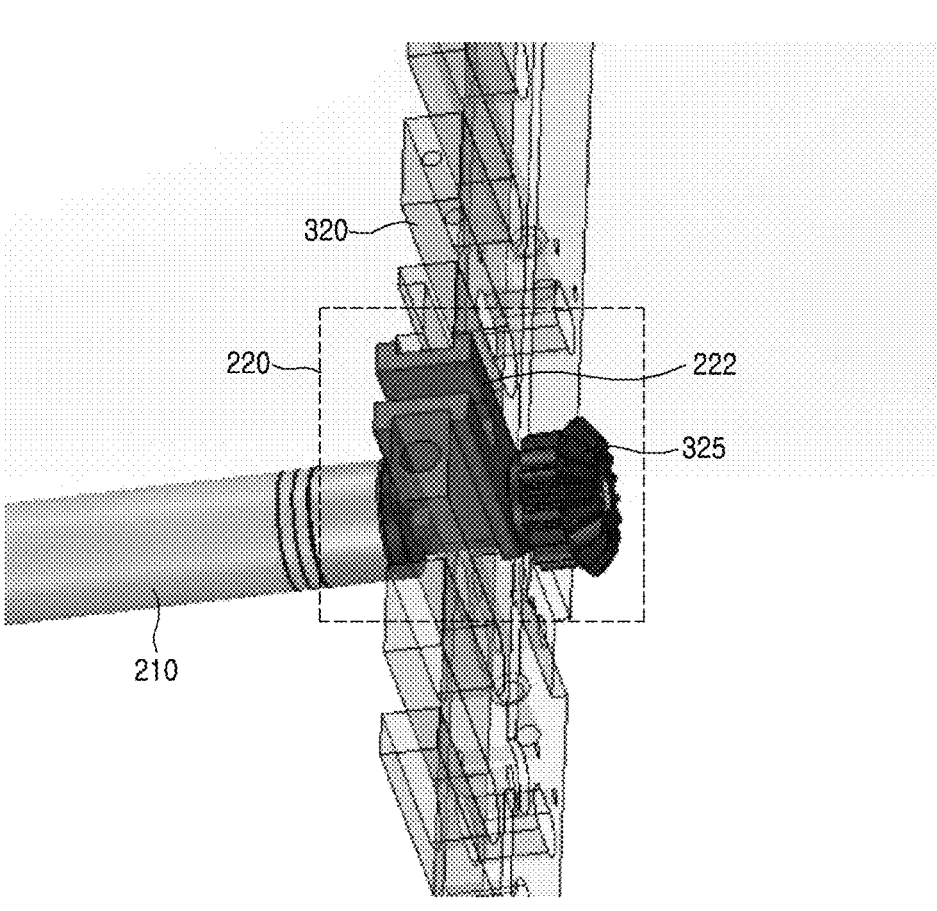

FIGS. 3A to 3C illustrate a roller structure and an arrangement structure of the product processing apparatus in which the roller structure is arranged according to one example.

Below, the arrangement structure of a first connection structure part 310 and a second connection structure part 320 of the product processing apparatus 100 of the roller structure 200 will be described, and the operation of the bearing structure part 230 according to the operation of the roller structure 200 will be described in more detail. The roller structure 200 may be disposed inside the product processing apparatus 100, which is an apparatus in which a processing process of a product is performed.

The block fixing part 220 on the one end part of the roller structure 200 may be arranged (mounted) on the second connection structure part 320, and the bearing structure part 230 on the another end part of the roller structure 200 may be arranged (mounted) on the first connection structure part 310.

The bearing structure part 230 may be configured to allow the movement of the roller bar 210 in at least a first direction while a processing process is performed (i.e., while the roller structure 200 is operating). That is, the bearing structure part 230 may be disposed on the first connection structure part 310 to allow the movement of the roller bar 210 in the at least first direction while the roller bar 210 rotates. Here, the first direction may be an upward direction which is a direction in which the product is disposed, for example, a direction perpendicular to the longitudinal direction of the roller bar 210.

The bearing structure part 230 may be disposed on the first connection structure part 310 which is empty in the first direction so that the bearing structure part 230 is able to move in the first direction inside the product processing apparatus 100. In other words, the first connection structure part 310 may have a structure which the bearing structure part 230 is mounted to, which is open or empty upward so that the mounted bearing structure part 230 may move upward in the first direction.

For example, as illustrated in more detail in FIG. 3B, the first connection structure part 310 may include a hole part 315 in which the bearing structure part 230 is disposed. The bearing structure part 230 may be arranged to be movable in the upward direction, which is the first direction, inside the hole part 315. The parts corresponding to the first ring part 234 and the second ring part 236 of the bearing structure part 230 described above may be inserted into the hole part 315, and the hole part 315 may be formed larger than the diameter of the roller structure 200 to allow an upward movement on the another end part of the roller structure 200. A space secured through the hole part 315 may be a spare space that exists to prevent loss of the straightness of the rotation of the roller bar 210 described above in FIG. 2C. Therefore, due to this spare space, the one end part and the another end part of the roller bar 210 do not have forces directed in different directions, and thus the roller bar 210 may move only slightly upward. The upward movement of the roller bar 210 may be within an acceptable vibration range for a product on the roller bar 210.

The first connection structure part 310 may include a plurality of hole parts 315, and the another end part of the roller structure 200 may be placed in each of the hole parts.

The second ring part 236 is fitted into and assembled with the hole part 315, and the first ring part 234 may be located inside the second ring part 236, and the roller bar 210 (i.e., the rotation shaft 232 of the roller bar 210) may be assembled while penetrating the first ring part 234. By having this structure, even if the straightness of the roller bar 210 is slightly deviated, the first ring part 234 may absorb a stress that occurs while rotating in the state in which the straightness is deviated (acting as a bearing), and friction of the first ring part 234 with the second ring part 236 may be significantly reduced due to the sliding characteristics (smoothness) of the UPE and PEEK materials described above, and thus the rotation of the roller bar 210 (i.e., the rotation shaft 232) may be made relatively smoother. This efficient rotation of the roller bar 210 does not cause the rotational force on the roller bar 210 to condense and become stuck due to friction, and thus a substrate on the roller bar 210 may be prevented from bouncing upward. In addition, since each of the roller bars 210 has the same number of rotations, heat radiation of the substrate may also be prevented.

Meanwhile, In FIG. 3C, the arrangement of the second connection structure part 320 and the block fixing part 220 with respect to the second connection structure part 320 is illustrated in more detail.

As described above, the block fixing part 220 may include the block 222. The block 222 may be fixed to the second connection structure part 320. The block 222 may be an H-type block. The block 222 may have a hole formed therein so that the rotation shaft 232 of the roller bar 210 passes through the hole. Such a hole may be of a size that allows rotation of the roller bar 210 but allows the roller bar 210 to be fixed, that is, prevents the occurrence of unnecessary clearance. Meanwhile, a ring to prevent friction may be further provided between the roller bar 210 and the block 222 to be connected thereto. The ring is shown in blue in FIG. 3C. (Or, see a ring 224 of FIG. 5A)

The rotation shaft 232 passes through the block 222 through the hole and may be connected to a drive gear 325 for rotating the roller bar 210. The driving part for driving the roller structure 200 of the product processing apparatus 100 may rotate the roller bar 210 by rotating the drive gear 325. In the embodiment, even when the wear of the hole in the block 222 occurs due to the driving and the straightness of the rotation of the roller bar 210 is lost, the upward-defined space of the hole part 315 described above may prevent the loss of the straightness, and the stable rotation of the roller bar 210 may be guaranteed through the bearing structure part 230 functioning as a bearing. Even when the roller bar 210 expands (or contracts) in a harsh environment such as a high temperature inside the product processing apparatus 100, the stable rotation of the roller bar 210 may likewise be ensured.

The second connection structure part 320 may include a plurality of areas in which the block 222 is able to be mounted, and the block 222 may be mounted in each of the areas to be arranged on the one end part of the roller structure 200.

The description of the technical features described above with reference to FIGS. 1 and 2 may also be applied to FIGS. 3A to 3C, so overlapping descriptions will be omitted.

Figure 4A:
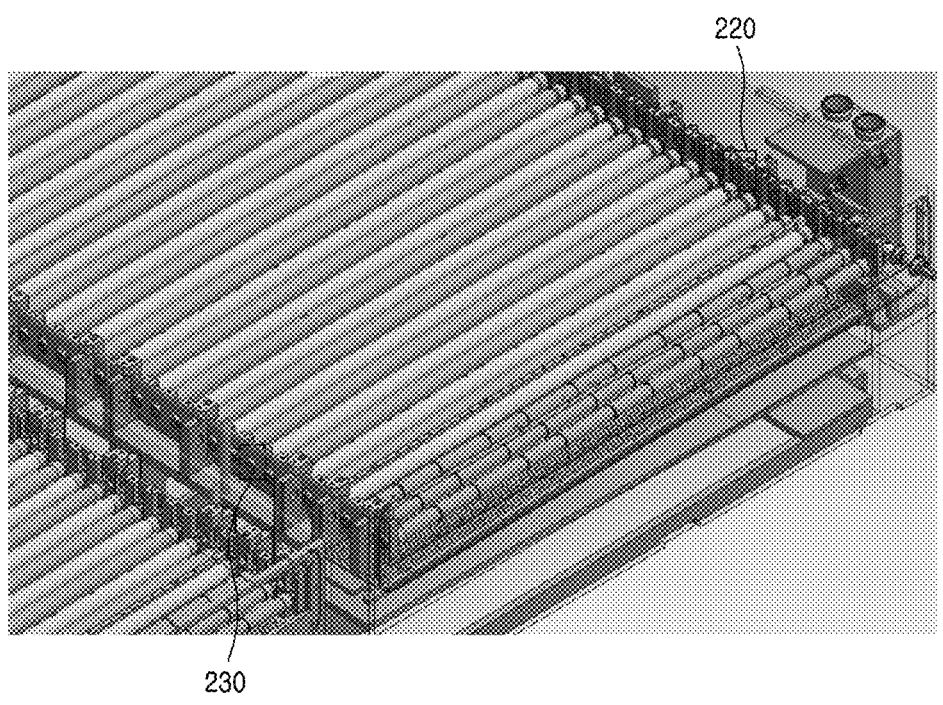
FIGS. 4A and 4B illustrate a portion of the product processing apparatus including the plurality of roller structures according to one example.
Figure 4B:
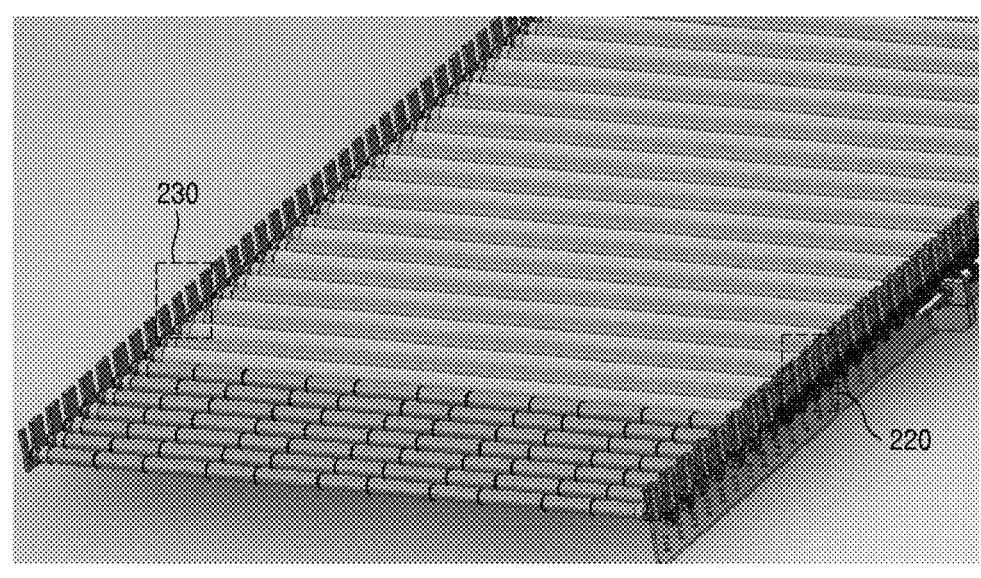

FIGS. 4A and 4B illustrate a portion of the product processing apparatus including the plurality of roller structures according to one example.

As illustrated, a plurality of roller structures 200 may be arranged in the product processing apparatus 100. As described with reference to FIG. 3, the bearing structure part 230 on the another end part of each of the roller structures 200 may be arranged (mounted) on the first connection structure part 310, and the block fixing part 220 on the one end part of each of the roller structures 200 may be arranged (mounted) on the second connection structure part 320.

FIG. 4B illustrates an embodiment in which the area of the first connection structure part 310 on which the bearing structure part 230 is disposed is open upward. In this way, the first connection structure part 310 may have a structure having an open upper side instead of the hole part 315. The drive gear 325 may be connected to each of the block fixing parts 220.

The description of the technical features described above with reference to FIGS. 1 to 3 may also be applied to FIGS. 4A and 4B, so overlapping descriptions will be omitted.

FIGS. 5A to 5D illustrate the structure of the one end part of the roller structure according to an embodiment.

Figure 5A:
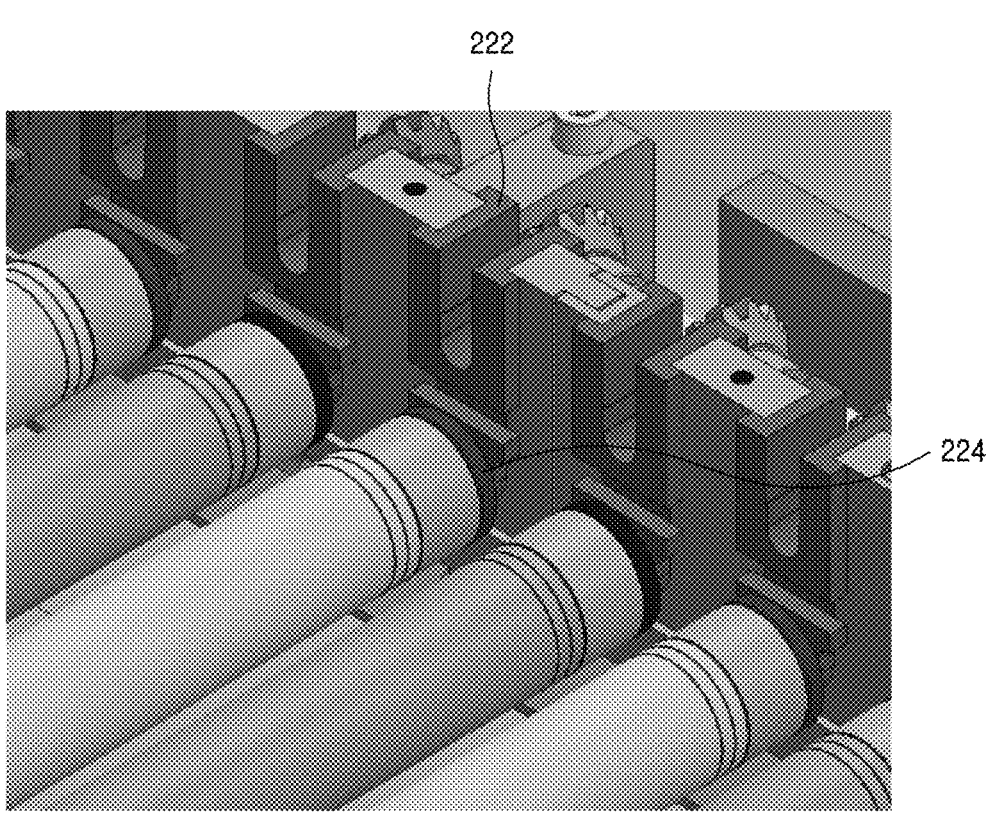
FIGS. 5A to 5D illustrate a structure of one end part of a roller structure according to one example.

In FIG. 5A, the coupling of the block fixing part 220 with the second connection structure part 320 is illustrated at the side of the block fixing part 220. The block 222 of the block fixing part 220 may be fixed to the second connection structure part 320, and the block 222 may be an H-type block. The block 222 may include the hole through which the rotation shaft 232 of the roller bar 210 passes, and the rotation shaft 232 of the roller bar 210 may pass through the hole to be connected to the drive gear 325. In addition, the ring 224 may be provided between the roller bar 210 and the block 222 to be connected thereto so as to prevent friction therebetween. Such a ring may be a bushing and may be formed of rubber materials, resin materials, or metal materials, etc. The ring 224 may be arranged to facilitate the rotation of the roller bar 210 while preventing friction between the roller bar 210 and the block 222.

Figure 5B:
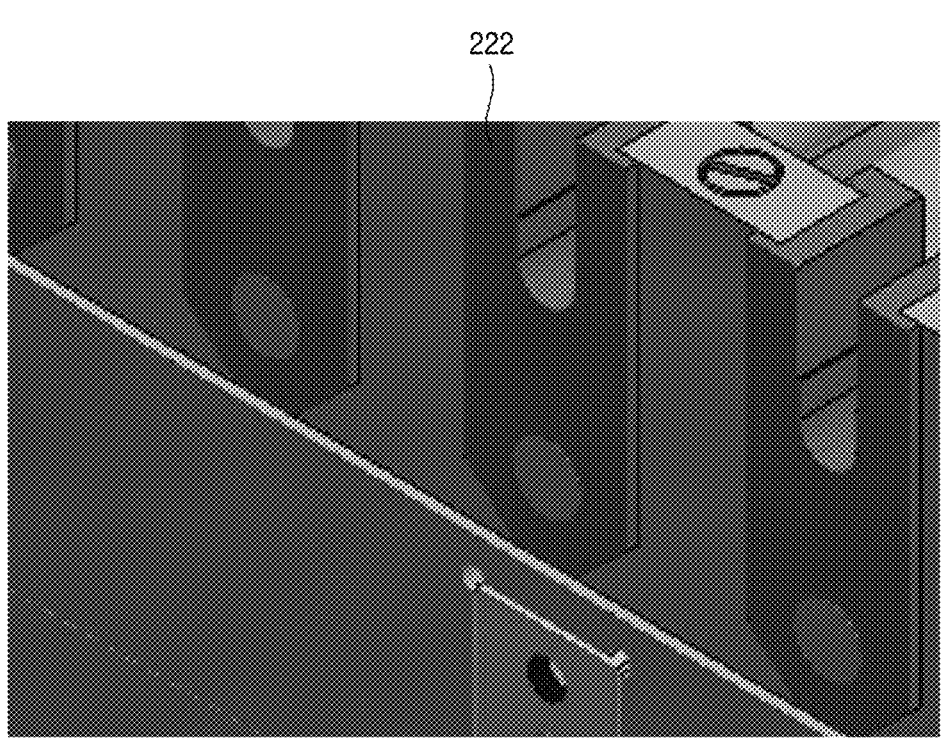
Figure 5C:
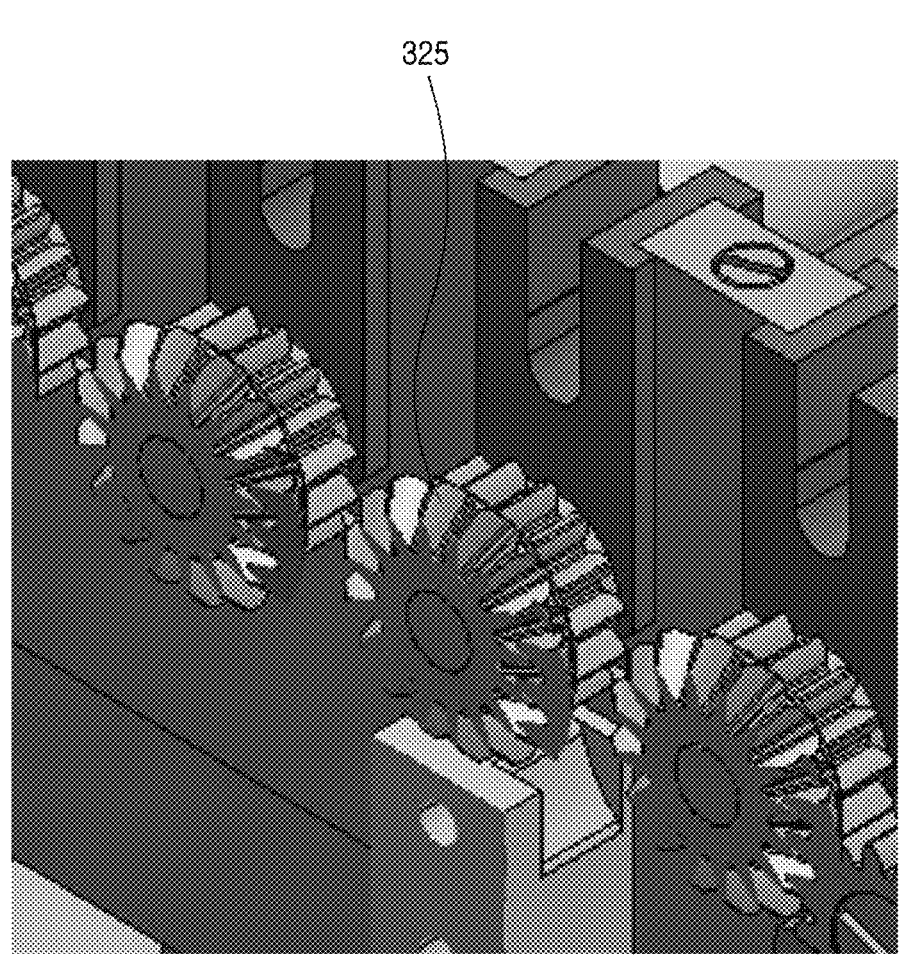
Figure 5D:
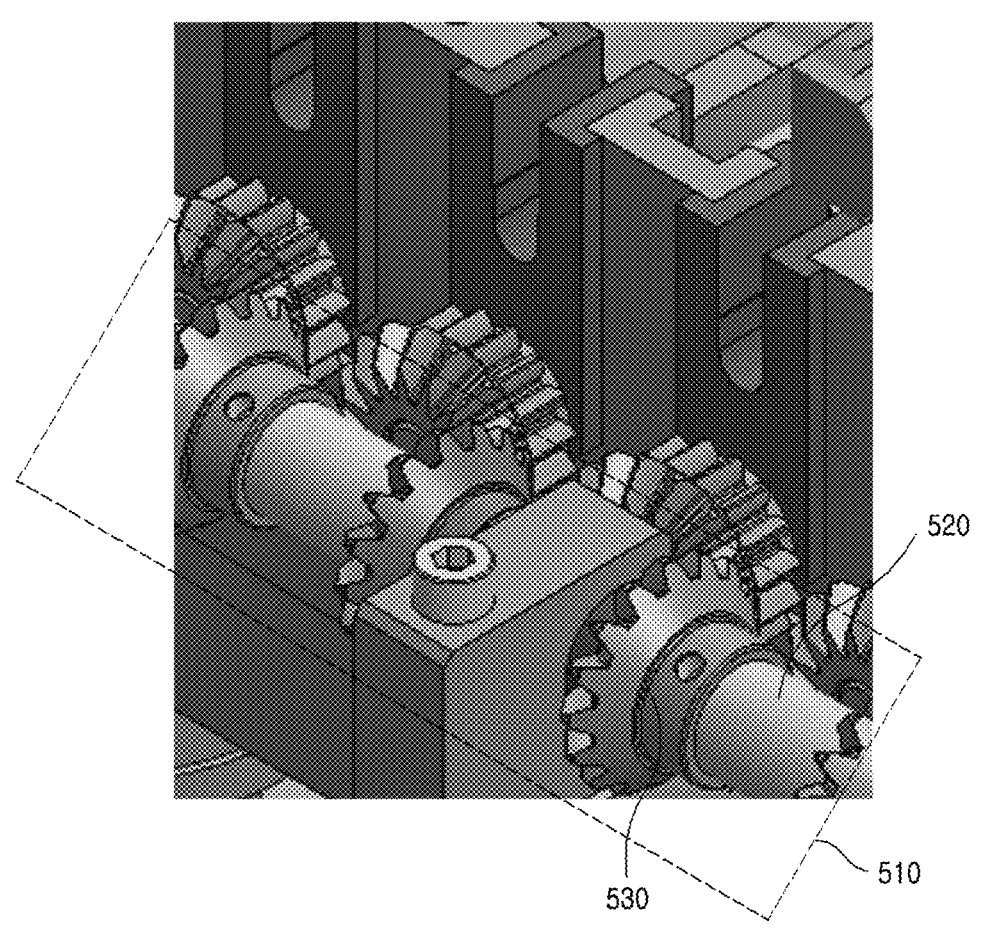

In FIGS. 5B to 5D, the coupling of the block fixing part 220 and the second connection structure part 320 is illustrated at the side of the second connection structure part 320.

FIG. 5B illustrates a state before the rotation shaft 232 passing through the hole of the roller bar 210 is connected to the drive gear 325, and FIG. 5C illustrated a state in which the rotation shaft 232 is connected to the drive gear 325.

Meanwhile, as illustrated in FIG. 5D, on the first end part which is the one end part of the roller structure 200, the drive gear 325 may be engaged with a gear 530 mounted on a drive bar 520 configured to rotate for the rotation of the roller bar 210. The drive bar 520 and the gear 530 may be the driving part of the product processing apparatus 100 for rotating the roller bar 210.

In the arrangement of the product processing apparatus 100, the roller bar 210 may be arranged perpendicular to the drive bar 520 and may be configured to rotate according to the rotation of the drive bar 520. In other words, when the drive bar 520 rotates, the gear 530 rotates, and the drive gear 325 engaged with the gear 530 may rotate, and accordingly, the roller bar 210 may rotate. Accordingly, when the substrate processing apparatus 100 including the plurality of roller structures 200 is implemented, each of the roller bars 210 of the plurality of roller structures 200 may rotate in cooperation with each other, and accordingly, be configured to transport a substrate placed on the roller bars 210.

Meanwhile, the connection structure with the driving part (the drive bar 520 and the gear 530) may be provided only on the first end part, which is the one end part of the roller structure 200, and may not be provided on the second end part, which is the another end part of the roller structure 200.

The description of the technical features described above with reference to FIGS. 1 to 4 may also be applied to FIGS. 5A to 5D, so overlapping descriptions will be omitted.

Figure 6:
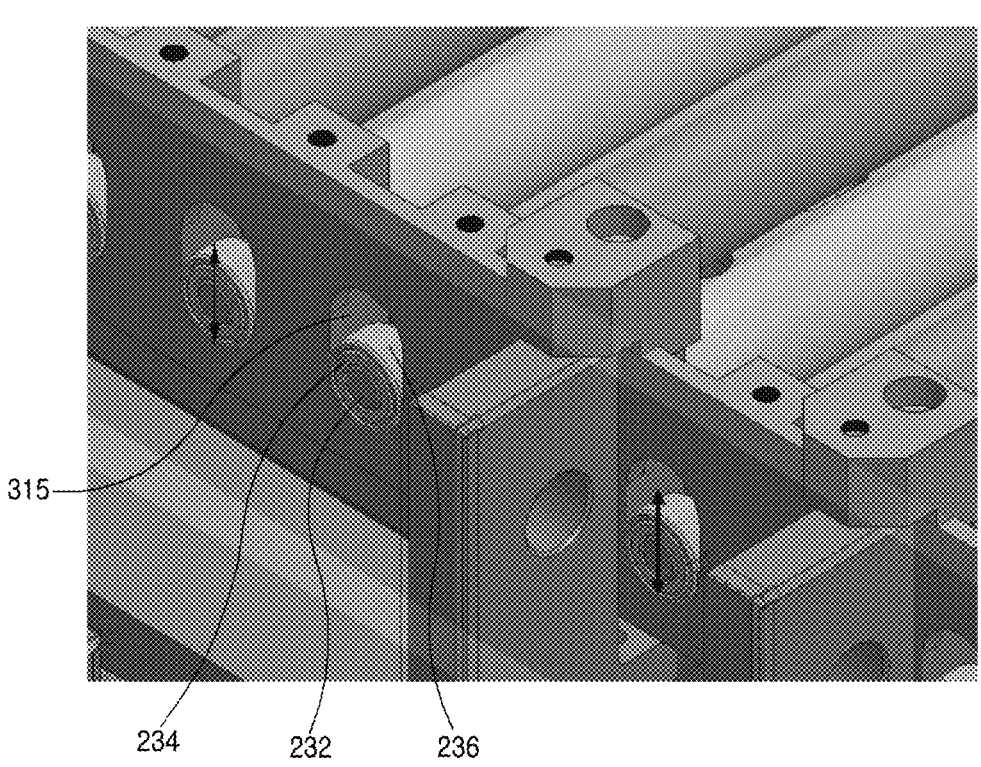
FIG. 6 illustrates a structure of another end part of a roller structure according to one example.

FIG. 6 illustrates the structure of the another end part of the roller structure according to one example.

The connection structure with the driving part (the drive bar 520 and the gear 530) may not be provided on the another end part.

As illustrated, each roller structure 200 of the plurality of roller structures 200 may be arranged in the hole part 315 formed in the first connection structure part 310. The hole part 315 may be formed in an oval shape to have a structure in which an upper part of an area of the hole part 315 in which the bearing structure part 230 of the roller structure 200 is disposed is empty. In other words, the hole part 315 may have an oval shape in which the cross section and width (a short axis) of the bearing structure part 230 are (almost) the same but a length (a long axis) thereof is longer. Alternatively, the hole part may have a shape that has a semicircular shape only on each of lower and upper sides thereof. The hole part may be formed through punching or drilling.

As described above, the bearing structure part 230 may include the rotation shaft 232, the first ring part 234, and the second ring part 236, the parts corresponding to the first ring part 234 and the second ring part 236 may be inserted into the hole part 315.

By having the structures of the bearing structure part 230 and the first connection structure part 310 as in the embodiment, even if a movement occurs in a left-to-right direction (i.e., a direction in which a substrate moves) on the first end part (i.e., the block fixing part 220) which is the one end part due to various reasons, the impact of the movement may be minimized on the second end part (i.e., the bearing structure part 230) which is the another end part.

Accordingly, the product processing apparatus 100 of the embodiment may significantly increase the yield of products compared to other product processing apparatuses that use a Schmid driving method.

The description of the technical features described above with reference to FIGS. 1 to 5 may also be applied to FIG. 6, so overlapping descriptions will be omitted.

As described above, although the embodiments have been described with limited embodiments and drawings, various modifications and variations may be made by those skilled in the art from the above description. For example, it is possible to achieve appropriate results even when the described techniques are performed in a different order than the described method, and/or components of the described system, structure, device, circuit, etc. are coupled or joined in a different form than the described method, or substituted or replaced by other components or equivalents.

The present disclosure may provide the roller structure that includes the block fixing part coupled to the roller bar to fix the roller bar at the one end part (the first end part) of the roller bar, and the bearing structure part configured to maintain the straightness of the rotation of the roller bar during operation of the roller bar while maintaining the roller bar at the second end part of the roller bar, thereby preventing structural deformation or damage to the roller bar.

The present disclosure may provide the roller structure, in which even in the case of damage to the roller structure, such as the expansion of the roller bar due to a high temperature inside the processing apparatus or the wear of the roller bar or surrounding structure due to repeated performance of the process, during product transfer, straightness thereof is able to be maintained and the unnecessary vibration of a product is able to be suppressed as much as possible.

Accordingly, it is possible to increase the durability of an apparatus such as the substrate processing apparatus.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:
1. A roller structure used to transport a product, the roller structure comprising:
   a roller bar configured to allow the product to be arranged thereon and to rotate for transporting the product in one direction;

a block fixing part coupled to the roller bar to fix the roller bar on a first end part which is one end part of the roller bar; and a bearing structure part configured to maintain straightness of the rotation of the roller bar during operation of the roller bar while maintaining the roller bar on a second end part which is another end part opposite to the one end part of the roller bar, wherein the roller bar includes a rotation shaft to rotate for transporting the product, and the bearing structure part includes a first ring part arranged to surround the rotation shaft and a second ring part arranged to surround the first ring part, wherein the first ring part is formed of polyetheretherketone (PEEK), and the second ring part is formed of ultra-high molecular weight polyethylene (UPE).

2. The roller structure of claim 1, wherein the roller structure is arranged inside an apparatus in which processing processes of the product are performed, and the bearing structure part is configured to allow a movement of the roller bar in at least a first direction while the processing processes are performed.

3. The roller structure of claim 2, wherein the first direction is an upward direction which is a direction in which the product is disposed, and the bearing structure part is arranged on a connection structure part including an empty side in the first direction so that the bearing structure part is movable in the first direction inside the apparatus.

4. The roller structure of claim 3, wherein the connection structure part includes a hole part in which the bearing structure part is arranged, and the bearing structure part is arranged to be movable in the first direction inside the hole part.

5. The roller structure of claim 1, wherein the first ring part and the second ring part are respectively formed of materials different from each other.

6. The roller structure of claim 1, wherein the block fixing part includes a block in which a hole through which the rotation shaft passes is formed, and the rotation shaft passes through the block and is connected to a drive gear for rotating the roller bar.

7. The roller structure of claim 6, wherein on the first end part, the drive gear is engaged with a gear mounted on a drive bar configured to rotate for the rotation of the roller bar, and the roller bar is arranged perpendicular to the drive bar and is configured to rotate according to the rotation of the drive bar.

8. A substrate processing apparatus comprising the roller structure of claim 1, with the roller structure including a plurality of roller structures, wherein the product is a substrate, and each roller bar of the plurality of roller structures is configured to rotate in cooperation with each other to transport the substrate.

* * * * *